(12) United States Patent
Pinson et al.

(10) Patent No.: US 6,668,908 B2
(45) Date of Patent: Dec. 30, 2003

(54) METHOD OF TORCH-CUTTING STEEL

(75) Inventors: Michael F. Pinson, Loveland, OH (US); Charles C. Wright, Cincinnati, OH (US)

(73) Assignee: Wright Brothers, Inc., Cincinnati, OH (US)

( * ) Notice: Subject to any disclaimer, the term of this patent is extended or adjusted under 35 U.S.C. 154(b) by 0 days.

(21) Appl. No.: 10/126,855

(22) Filed: Apr. 19, 2002

(65) Prior Publication Data
US 2003/0196777 A1 Oct. 23, 2003

(51) Int. Cl.[7] .............................................. B22D 11/126
(52) U.S. Cl. ......................................... 164/460; 266/48
(58) Field of Search ........................ 164/460; 148/194; 266/48

(56) References Cited

U.S. PATENT DOCUMENTS

| | | | | | |
|---|---|---|---|---|---|
| 4,336,078 | A | * | 6/1982 | Radtke | 148/197 |
| 4,437,899 | A | * | 3/1984 | Rokop et al. | 164/460 |
| 4,908,070 | A | * | 3/1990 | Grohmann | 164/460 |
| 5,922,144 | A | * | 7/1999 | Sykes | 148/194 |

* cited by examiner

*Primary Examiner*—M. Alexandra Elve
*Assistant Examiner*—Len Tran

(57) ABSTRACT

A method of torch-cutting steel, typically slab steel, produced by continuous casting wherein a cutting torch is fueled with propylene and oxygen and wherein the fuel is mixed and combusted on the surface of the slab thus permitting the cutting of the slab to proceed contemporaneously with the production of slab steel by the continuos casting process.

8 Claims, No Drawings

METHOD OF TORCH-CUTTING STEEL

BACKGROUND OF THE INVENTION

The instantly disclosed invention relates generally to a method of cutting steel; and, more particularly, to a method of torch cutting slab, bloom or billet steel. Slab steel is produced by the continuous casting method. Continuous casting is the process whereby molten steel is solidified into semi-finished billets, blooms or slabs for subsequent rolling in the finishing mills.

The continuous casting process begins by pouring steel from an electric or oxygen furnace into a ladle. The ladle is raised on to a turret that rotates the ladle into the casting position above a tundish. Liquid steel flows out of the ladle, into the tundish and then into a water-cooled copper mold. Solidification begins in the mold and continues through the forming process. Finally, the billet, bloom or slab is torch or machine-cut, discharged and stored for further processing.

It is during the torch cutting stage of the casting process that the instantly disclosed method contributes to the efficiency of the process and the quality of the finished product. Near the end of the casting process, the slab, bloom or billet is cooled, straightened and transferred on roller tables to a cut-off machine, which cuts the product into ordered lengths. This cutting is typically effected by torches. And torches, in the slab, bloom or billet casting process, are typically fueled by oxygen and a fuel gas. Fuel gasses are frequently hydrocarbons, such as natural gas (methane). Natural gas is a commonly employed fuel gas because it does an adequate job, it's readily available and it's relatively inexpensive.

DESCRIPTION OF THE PRIOR ART

The primary objective of this invention is to provide an improved fuel gas to replace methane so that the torch will generate a hotter flame, thus producing a narrower, quicker and cleaner cut. Other patent disclosures have suggested a variety of additives to be added to a hydrocarbon fuel gas to provide an alleged improvement in the cutting process, but none has disclosed the use of propylene to the exclusion of other hydrocarbons in the quantities or pressures suggested herein. U.S. Pat. No. 5,380,346, which issued Jan. 10, 1995 to Fritz, teaches that a fortified torch gas can be formulated from a mixture of a hydrocarbon base gas (LPG, and possibly propylene) and an additive selected from the group consisting of variety of ethers, aldehydes, ketones, glycols and alcohols. This patent also provides an elaborate discussion of the prior art relative to cutting fuels.

U.S. Pat. No. 5,922,144, which issued Jul. 13, 1999 to Sykes, discloses a method for expediting the cutting of steel, especially as the cutting relates to salvaging scrap steel from retired ships. The method involves the use of a combustion enhancing gas, typically oxygen, set at a level of 150 to 220 pounds per square inch (psi) and a combustible gas, such as propane, chemtane, propylene, Mapp or natural gas at 35 to 80 psi. It is alleged that this particular fuel mixture and method allows the operator to cut metal at a faster rate, typically 5 to 8 times as fast as conventional methods.

SUMMARY OF THE INVENTION

But, notwithstanding the teachings of the prior art, there remains a need for an improved method to enhance the speed and effectiveness of cutting slab, bloom and billet steel produced in the continuous casting process. This need is met by a method which comprises positioning a cutting torch to cut slab, bloom and billet steel into manageable dimensions; and, fueling said torch with propylene and oxygen and wherein said torch has a tip for delivering and blending said propylene with oxygen on a predetermined cutting line on the surface of said slab, and wherein the oxygen is delivered to the cutting surface of the slab steel at between 30 and 50 psi and the propylene is delivered to the cutting surface at between 5 and 25 psi.

DESCRIPTION OF THE PREFERRED EMBODIMENT

As mentioned supra, the primary objective of this disclosure is to introduce the use of propylene gas to the slab steel industry to improve the speed, efficiency and effectiveness of their slab splitting operations. Propylene is an ideal cutting fuel for the continuous casting process. It is readily available. It's a commodity feed stock for the plastics industry and is currently the tenth most produced chemical in the world. Because of its chemical properties, it has a higher BTU content and flame temperature than methane, and, when used as a cutting fuel, it burns hotter and cuts faster than methane.

In practice, slab steel is cut into manageable lengths by bringing the surface of the slab to an ignition temperature of about 1500° F. At this temperature, the slab has a bright reddish orange glow. With the slab at this temperature, a cutting torch is positioned about 5"–7" above the slab. The torch is adjusted to deliver between 5–25 psi of propylene and between 30–50 psi of oxygen to the slab surface. Of course it is desirable if, during the cutting procedure, the cutting proceeds at the speed of the casting, and the increased cutting speeds obtainable by the use of propylene is exactly what has been demonstrated in the mill.

Test No. 1. A 9" thick hot slab was cut into slabs at cutting speeds of 12"/min. with the use of natural gas as the cutting fuel. When propylene was substituted for natural gas, the cutting speed was increased to 19"/min, and the kerf was reduced by ³⁄₁₆". (AK Steel)

Test No. 2. A 9" thick hot slab was cut into slabs at cutting speeds of 10"/min. with natural gas; and, with the use of propylene as the fuel gas, the cutting speed was increased to 18"/min. and the kerf was reduced by ¼". (Wheeling Pit Steel)

Test No. 3. An 8" thick hot slab was cut into slabs at a cutting speed of 400 mm/min. with natural gas as the fuel gas and at 960 mm/min. when propylene was substituted as the fuel gas. In this instance, the kerf was reduced by ⅛". (Algoma Steel)

Test No. 4. A 6" hot slab was cut with natural gas at a cutting speed of 20"/min.; and when propylene was substituted as the fuel gas, the cutting speed was 38"/min. and the kerf was reduced by ³⁄₁₆". (Nucor Steel)

Test No. 5. When cutting a 6" hot billet, the cutting speed was increased from 17"/min., when using natural gas, to 39"/min., when using propylene; and the kerf was reduced by ³⁄₁₆". (KY Electric Steel)

Even more impressive cutting speed improvements were seen in cold slab splitting tests.

Test No. 6. A 9¾" thick cold slab was split at 6"/min. using natural gas and at 12"/min when propylene was substituted as the fuel gas. Additionally, the kerf was reduced by ³⁄₁₆". (AK Steel)

Test No. 7. A 9¾" thick cold slab was split at 7"/min. using natural gas and at 14"/min. when propylene was substituted as the fuel gas. The kerf as reduced by ³⁄₁₆". (US Steel)

In these comparative tests, the average natural gas pressures delivered to the torch ranged from 35 psi to 55 psi depending on the thickness of the steel.

For best results, torch stand-off should be between 4"–6", but cuts have been made with the torch as high as 8" above the work piece. The cutting oxygen should be presented or supplied to the torch at 190–205 psi, and when using a pre-post mix tip, the pre-heat oxygen should be supplied at 30–50 psi. Propylene pressure settings should preferably be between 6 and 13 psi, depending on the thickness of the slab. These fuel pressures, when used according to the disclosed slab cutting method will increase the cutting speed so that slab cutting and removal can keep pace with slab casting production. The cuts will generate reduced spiddle or dross, reduce kerf, and, surprisingly, reduce fuel consumption.

In a preferred embodiment of the disclosed invention, a post or pre/post mix tip is employed on the cutting torch. The post mix tip mixes the oxygen and the fuel gas (propylene) externally to the downstream end of the tip. A pre/post mix tip includes the traditional premixing of the oxygen and propylene in the tip or torch head, as well as downstream and external to the tip. With the post and pre/post mix tips, some of the fuel gas (propylene) is partially combusted at the end of the tip while the remainder is carried down the cutting oxygen stream where it burns in the kerf of the cut. Because propylene has a higher BTU and a higher flame temperature, and because the pre and pre/post mix tips are transporting propylene to the kerf, the cut is accelerated. When using a pre or pre/post mix tip, pre-heat oxygen should be supplied to the torch at 30 to 50 psi.

While the foregoing is a complete and detailed description of the preferred embodiment of the disclosed slab cutting method, numerous variations and modifications may be employed to implement the all-important purpose of the disclosure without departing from the spirit of the invention; and, therefore, the elaboration provided herein should not be assumed to limit, in anyway, the scope of the invention, which is fairly defined by the appended claims.

We claim:

1. A method of torch-cutting steel produced by continuous casting, said method comprising: casting a steel product, positioning a cutting torch to cut said steel into manageable dimensions; and, fueling said torch with cutting oxygen at between 190–205 psi and propylene at between 5–25 psi and wherein said torch has a tip for blending said propylene and said cutting oxygen with pre-heat oxygen at between 30–50 psi on a predetermined cutting line on the surface of said steel.

2. The method according to claim 1 wherein the torch is positioned to cut said steel transversely.

3. The method according to claim 1 wherein the torch is positioned to cut said steel longitudinally.

4. The method according to claim 1 wherein the torch is fitted with a post mix tip.

5. The method according to claim 1 wherein the torch is fitted with a post/pre mix tip.

6. The method according to claim 1 wherein the steel is in the form of a slab.

7. The method according to claim 1 wherein the steel is in the form of a billet.

8. The method according to claim 1 wherein the steel is in the form of a bloom.

* * * * *